United States Patent
Ehn et al.

(10) Patent No.: US 7,283,649 B1
(45) Date of Patent: Oct. 16, 2007

(54) SYSTEM AND METHOD FOR IMAGE RECOGNITION USING STREAM DATA

(75) Inventors: Dennis C. Ehn, Newton, MA (US); Francis J. Cusack, Jr., Groton, MA (US)

(73) Assignee: Viisage Technology, Inc., Littleton, MA (US)

( * ) Notice: Subject to any disclaimer, the term of this patent is extended or adjusted under 35 U.S.C. 154(b) by 683 days.

(21) Appl. No.: 10/377,591

(22) Filed: Feb. 27, 2003

(51) Int. Cl.
*G06K 9/00* (2006.01)

(52) U.S. Cl. .................................... 382/118

(58) Field of Classification Search ........... 382/115, 382/118, 220, 284, 286
See application file for complete search history.

(56) References Cited

U.S. PATENT DOCUMENTS

| | | | | |
|---|---|---|---|---|
| 5,164,992 A | * | 11/1992 | Turk et al. ................. | 382/2 |
| 6,345,109 B1 | * | 2/2002 | Souma et al. .............. | 382/118 |
| 6,430,307 B1 | * | 8/2002 | Souma et al. .............. | 382/118 |
| 2003/0007669 A1 | * | 1/2003 | Martinez ..................... | 382/118 |
| 2006/0110014 A1 | * | 5/2006 | Philomin et al. ........... | 382/118 |

* cited by examiner

*Primary Examiner*—Andrew W. Johns
(74) *Attorney, Agent, or Firm*—Lahive & Cockfield, LLP (57) ABSTRACT

Methods and systems for identifying an individual are provided. The systems and methods make use of principal component analysis and account for intra-individual variation by utilizing a plurality of images obtained from a stream of data representing a plurality of images of the individual. To identify the individual the system and method account for the intra-individual variation in the stream of data to produce a compensated representation of the individual. The system and method and to match the compensated representation a representation from a reference database to identify the individual.

17 Claims, 4 Drawing Sheets

SYSTEM AND METHOD FOR IMAGE RECOGNITION USING STREAM DATA

TECHNICAL FIELD

The present invention relates generally to image recognition, and specifically relates to determining whether an image corresponds to a particular class of objects using stream data.

BACKGROUND

There are many circumstances where identifying an individual is of paramount concern. For example, security needs often dictate that an individual be correctly identified before the individual is permitted to perform some task, such as utilizing an automated teller machine (ATM) or entering a commercial airplane, a federal or state facility, an embassy, or other restricted area.

Traditional means of identification include signature and fingerprint identification. While useful in many circumstances, such methods, however, suffer from being intrusive because they require individuals to perform some act like signing or staining their thumb. Aside from the inconvenience of having to perform these acts, another drawback of such identification methods is that it gives the individual an opportunity to thwart the method by, for example, forging a signature.

Other identification and verification systems rely on capturing an image of a person, which is subsequently compared with images in a reference database. If there is a match between the image of the person and an image in the reference database, then the person is positively identified provided the matched image in the database is associated with a personal identifier, such as a name or social security number. If, on the other hand, there is no such match, the person is excluded from belonging to the reference database.

The capture and manipulation of image data with modern identification systems places an enormous processing burden on the system. Prior art systems have addressed this problem by using Principal Component Analysis (PCA) on image data to reduce the amount of data that need to be stored in the reference database for the system to operate efficiently. An example of such a system is set forth in U.S. Pat. No. 5,164,992, the contents of which are hereby incorporated by reference.

The foregoing system operation suffers from a lack of accuracy when different images of the same object are deemed to be different objects by the recognition system. Modern system applications require accurate and timely analysis to minimize the inconvenience to people seeking access to a restricted area or attempting to perform a monetary transaction, such as at an ATM.

SUMMARY OF THE INVENTION

In light of the limitations of conventional recognition system for identifying individuals, it would be helpful to account for variations among images of the same individual. To this end, the present system is better able to recognize that images of one individual showing various variations, due to different poses, illumination, or expression, for example, correspond to the same individual. This present invention helps enhance the ability of a face recognition system to distinguish between individuals.

In one embodiment, a system for identifying an object is described herein that includes an image data preprocessor for associating an image of the object with a first vector, a projection module for projecting the first vector to form a second vector, and an image acquisition device for capturing data to obtain a first plurality of vectors representing the object. To account for intra-object variation in the image, the system also includes an extractor for forming a third vector from the second vector and at least one of the first plurality of vectors representing the object and a second plurality of vectors representing a reference object. The system further includes a discrimination stage for evaluating a function of the third vector to match the image to a database. The image acquisition device can include a video recorder to obtain video images, and a frame grabber to obtain the first plurality of vectors representing the object from the video images.

In another embodiment, a method for identifying an object is provided. The method includes associating an image of the object with a first vector, projecting the first vector to form a second vector, and capturing data with an image acquisition device to obtain a first plurality of vectors representing the object. To account for intra-object variation in the image, the method further includes forming a third vector from the second vector and at least one of the first plurality of vectors representing the object and a second plurality of vectors representing a reference object. The method also includes evaluating a function of the third vector to match the image to a database.

In another aspect of the present invention, a method for identifying an individual is provided. Using a number of images of the individual to be identified, the method determines a range of one or more parameters in the images of the individual. To characterize image variation of the individual amongst the images the method generates a reference representation of the individual using the images and the range of one or more parameters. By selecting one of the images and compensating the selected image using the reference representation to counteract at least a portion of the image variation of the individual amongst the images, the method is capable of determining if the selected image sufficiently corresponds to a representation from a storage device to possibly identify the individual.

In still another aspect of the present invention, a system for identifying an individual is provided. The system includes an image data manipulation module for determining a range of one or more parameters in a number of images of the individual one wishes to identify. From the images and the range of the one or more parameters, the image data manipulation module generates a reference representation of the individual, the reference representation characterizing image variation of the individual amongst the images. The image data manipulation module compensates at least one of the images using the reference representation to counteract at least a portion of the image variation of the individual amongst the plurality of images. The system further includes a discrimination module for determining if the compensated image matches a representation from a storage device to within one or more specified tolerances to identify the individual.

In yet another aspect of the present invention, a device readable medium holding device executable instructions for performing a method for identifying an individual is provided. The method determines from a number of images of the individual one or more image components in the images of the individual that vary due to illumination of the individual, facial expression of the individual and pose of the individual. In course, the method generates a reference representation of the individual using the images and the one or more image components to characterize the image variation of the individual amongst the images. By selecting one of the images and compensating the selected image using the reference representation to counteract at least a portion of the image variation of the individual determined amongst the images, the method is capable of determining if the selected image corresponds to a representation from a storage device to identify the individual.

DETAILED DESCRIPTION

The intrapersonal variations can be accounted for by using stream data, such as a video stream, captured by the image recognition system during a recognition engagement with an individual. As an individual approaches the image recognition system, a number of images are acquired by an image acquisition device, such as a video recorder. These images can be digitized by an image data preprocessor with the use of a frame grabber, and utilized to recognize the individual. In addition to providing multiple probe images, these images may be processed in real time to help characterize intrapersonal variations for that individual. For example, one person may vary the angle of his head pose, or he can change his facial expression. By characterizing and suppressing some or all of these observed variations, the contribution of these image differences can be removed appropriately.

FIGS. 1 through 4, wherein like parts are designated by like reference numerals throughout, illustrate an exemplary embodiment of a system and method suitable for identifying an object. Although the present invention is described with reference to the example embodiments illustrated in the figures, it should be understood that many alternative forms could embody the present invention. One of ordinary skill in the art will additionally appreciate different ways to alter the parameters of the embodiments disclosed, such as the size, language, interface, or type of elements or materials utilized, in a manner still in keeping with the spirit and scope of the present invention.

Figure 1:
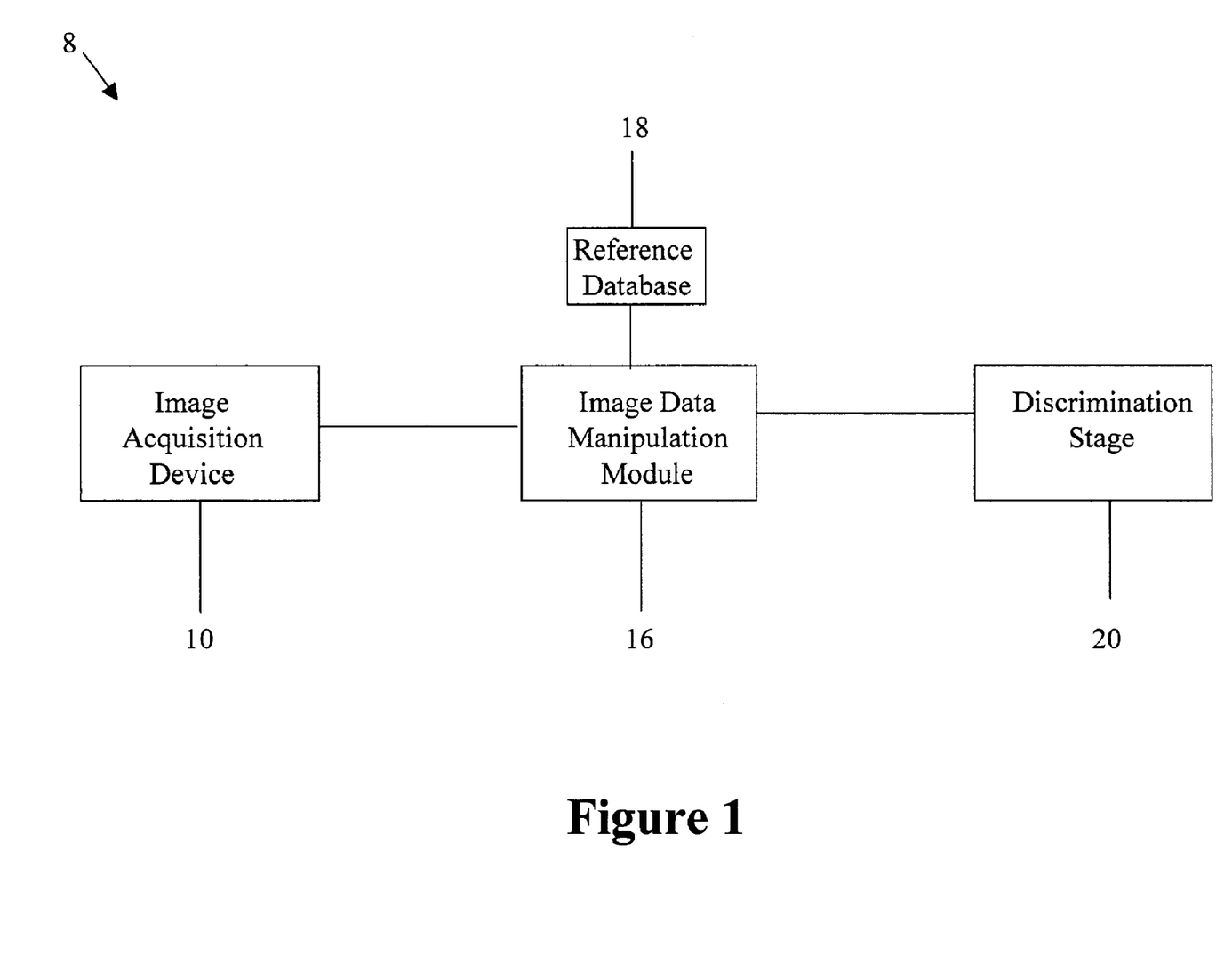
FIG. 1 illustrates an exemplary image recognition system suitable for practicing an illustrative embodiment of the present invention.

Referring to FIG. 1, an exemplary recognition system 8 is shown for recognizing an object. An image acquisition device 10 contained therein is utilized to obtain a stream of image data of an object such as, an individual to be recognized in a particular setting. The stream of data refers to data associated with a sequence of images separated in time. For example, a video camera captures a stream of data corresponding to a sequence of events in time, the time difference between frames often being a fraction of a second. When viewing a video recording an individual interprets the sequence of images as continuous despite the fact that there is often a time difference between video frames, which can be some number $\epsilon$ greater than zero. The time interval $\epsilon$ is often much less than a second.

The sequence of images used by the exemplary recognition system 8, however, need not be separated in time by $\epsilon$. For example, in one embodiment of the present invention, the time interval between images utilized can be one second or more. The image acquisition device 10 can include any sensor or apparatus that can obtain or acquires a stream of data of an object. In one embodiment, the image acquisition device 10 can include a camera, such as a digital camera, for acquiring an image the individual at a sequence of times, a video camera or a digital video camera. In another embodiment, the image acquisition device 10 can include a database retriever, such as a computer, for retrieving a temporal sequence of stored images from databases, or storage devices. The image acquisition device 10 can include other suitable devices, for example, CCD cameras and scanners.

The exemplary recognition system 8 also includes an image data manipulation system 16 for manipulating image data and a reference database 18 that contains reference vectors, corresponding to images of individuals. The reference database 18 optionally includes associated names, social security numbers, or other identifiers that allow the individual to be identified. The reference database 18 can include images corresponding to different individuals, and varied images (corresponding to different poses, lighting, etc.) of the same individual. An image in the reference database 18 can be denoted by $\Omega_i^j$, the ith image of individual j. The discrimination stage 20 includes software and hardware for distinguishing the individual using the image obtained by the acquisition device 10. Distinguishing an individual includes both positively identifying an individual, as well as excluding an individual by determining that there is no match between an image and reference images in the reference database 18.

The image acquisition device 10 functions to obtain, or acquire a stream of data corresponding to a plurality of images of the individual, which may be used to account for intrapersonal variations of the individual, as described in more detail below. As used herein, a stream of data refers to data associated with a sequence of images separated in time that may be obtained, for example, by a video camera or other suitable image acquisition device. When viewing a video recording, an individual interprets the sequence of images as continuous despite the fact that the minimum of the time intervals between frames may be some time $\epsilon$ greater than zero. The time $\epsilon$ can be much less than a second. The sequence of images that are the plurality of images used by the exemplary recognition system 8, however, need not be separated in time by $\epsilon$. For example, in one embodiment of the present invention, the time interval between images utilized can be one second or more.

Unfortunately, in a sequence of images obtained by a video camera of the same individual over even a short span of time, there are differences in pose, illumination, expression, and items (e.g., eye glasses) worn on or about the individual's face. Although these are bona fide differences, it is not desirable to have the recognition system conclude that the individual in the images is a different person due to such intrapersonal variations. Instead, such a recognition system should rely on interpersonal differences to perform image recognition. As described below, the present invention utilizes a plurality of images to properly account for intrapersonal differences.

The image acquisition device 10 can include any sensor or apparatus that can obtain a stream of data of an object. The stream of data can be converted to image data for processing by the image data manipulation system 16 to extract information of the individual suitable for use in recognition of the individual. The discrimination stage 20 utilizes this information to determine if the image corresponds to that of a human. If it does not, no further analysis of the image data need be performed. If the image is determined to correspond to a human, then the discrimination stage 20 determines whether the information matches respective information associated with the reference database 18 within a specified tolerance. If there is a match, then the individual can be positively identified by using the personal identifier associated with the matched information. If there is no match, then the individual is not included among the individuals identified in the reference database 18.

Figure 2:
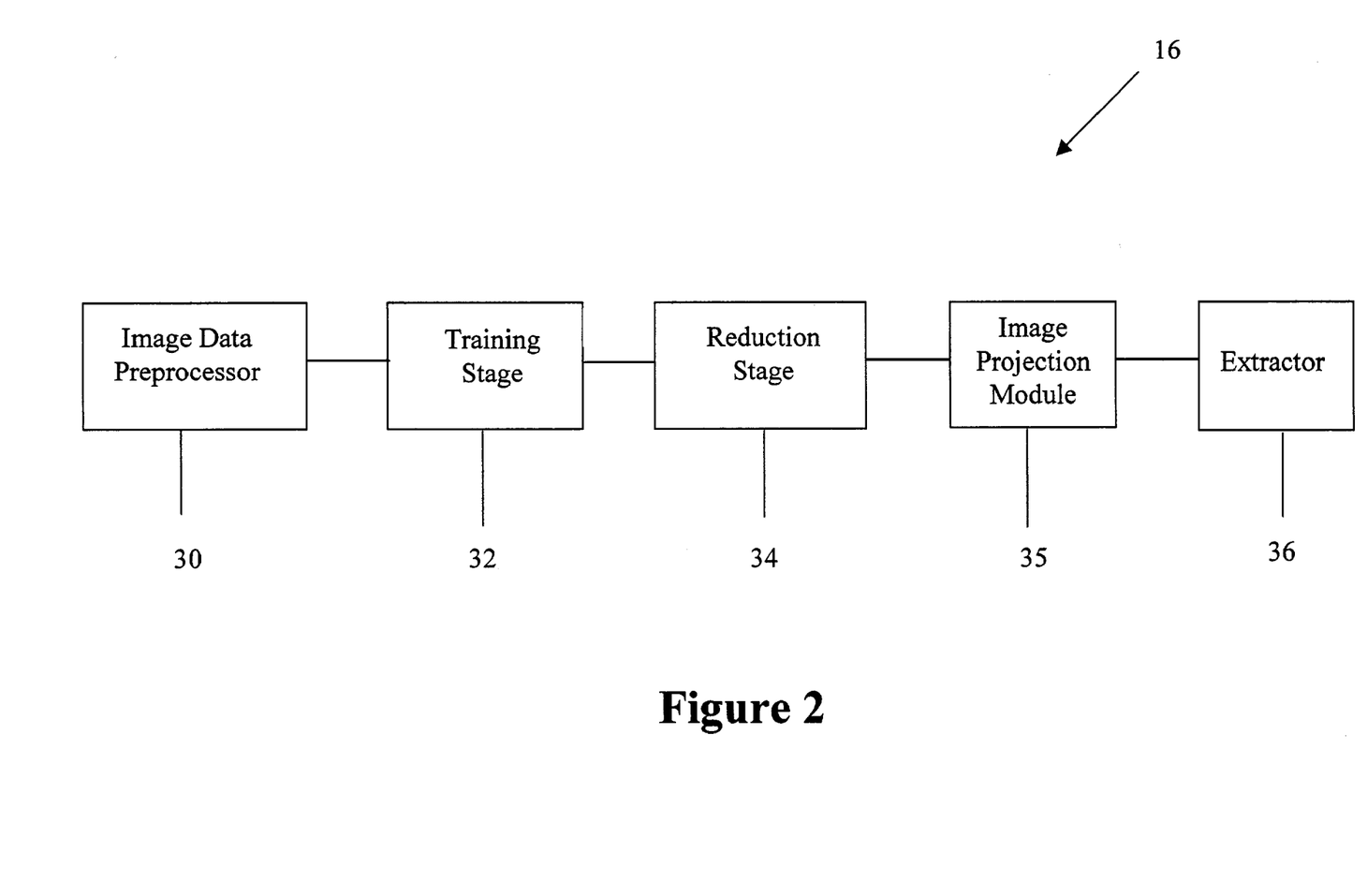
FIG. 2 illustrates a portion of the exemplary image recognition in FIG. 1 in more detail.

Image Data Manipulation System:

Referring to FIG. 2, the image data manipulation system 16, which includes hardware and software to form and manipulate image data, includes an image data preprocessor 30, a training stage 32, a reduction stage 34, an image projection module 35, and an extractor 36.

The image data preprocessor 30 obtains, or prepares, or both, a stream of image data acquired by the image acquisition device 10. For example, if the image acquisition device 10 is a digital camera that takes a sequence of digital photographs, the image is converted to digital image data by the image acquisition device 10. Nevertheless, those skilled in the art will recognize that the stream of data acquired by the image acquisition device 10 can be digitized by means external to the image acquisition device 10. The image data preprocessor 30 may then obtain from the stream of data image data and, if necessary, further process the stream of data, as described below. If, on the other hand, the image acquisition device 10 does not produce suitable image data, the image data preprocessor 30 may convert the stream of data to suitable image data by, for example, digitizing it. In addition, the image data preprocessor 30 can process images from the reference database 18 to prepare appropriate image data corresponding to those images. For example, if the reference database 18 of images includes photographs, the image data preprocessor can include a scanner for scanning the photographs and producing digitized representations of the photographs.

Thus, in one embodiment, the image data preprocessor 30 collects the acquired image or images, and, if necessary, converts the acquired image or images into suitable image data, such as digital luminance values, chrominance values, grey scale, and other data associated with, defining, or characterizing an image. For example, the corresponding gray scale image can be used for distinguishing the individual by ascribing a particular intensity to pixels corresponding to locations within the image.

A computer software tool can be utilized to read pixel data pertaining to the image from a variety of image formats. The image can be a 24-bit red, green and blue (RGB) color image. RGB values for each pixel are summed to represent the color value. Data can be stored in a new file containing the RGB value of each pixel in the image. For an image size of 480×640, for example, each pixel is represented as three, eight-bit numbers. Histogram equalization with 255 gray level bins may be used to adjust the red, green and blue colors for generating the gray scale image, which may then be processed further for distinguishing the individual. Color information obtained by the image acquisition device 10 can be used profitably. Color image files are large but easily mapped into a gray scale to produce a gray scale image. In another embodiment, the color of the image can be used for facial recognition or other stages of processing, for example flesh tone analysis or tracking based on flesh tone.

In addition, the image data preprocessor 30 standardizes the contrast and brightness of the image to be matched. It has been recognized that the contrast and brightness of the image to be matched may differ significantly from those in a reference set of images from the reference database 18. These differences may skew the matching results, and thus create errors in detection. The present invention compensates for these differences. Specifically, the image to be matched is adjusted relative to each image from the reference set before correlation is performed. The statistical mean and standard deviation of all the pixel values for the individual reference image are determined, and the pixel values of the image to be matched are adjusted according to:

$$I_s(x_i, y_j) = cI(x_i, y_j) + b,$$

where $$c = \Delta I_R / \Delta I$$

$$b = \langle I_R \rangle - \langle I \rangle \frac{\Delta I_R}{\Delta I}$$

and $I(x_i, y_j)$ are the original pixel values in the image to be matched. In these last two equations, $\Delta I$ is the standard deviation of the pixel values of the image to be matched (the unknown image), $\Delta I_R$ is the standard deviation of the reference pixel values of the reference image being compared to the unknown image, $\langle I \rangle$ is the average value of the unknown pixel values, and $\langle I \rangle$ is the average value of the reference pixel values. In one embodiment, the images of the reference set are all standardized to have $\Delta I_R=(\text{No. Pix.})^{-1/2}$, where "No. Pix." is the number of pixels in the reference image, and $\langle I_R \rangle=0$. In addition, the image may be scaled to a standard size based on the location of the eyes, for example. A mask is applied and the active pixels within the masked region may be utilized to form an image vector whose pixel average and standard deviation can be adjusted as described above.

The training stage 32 functions to input image data corresponding to several images, and to then calculate an average image, $\Psi$. The average image is later used to compute a variance matrix used for further analysis, as described below.

The reduction stage 34 finds M meaningful eigenvectors that span a face space of dimension $M<N^2$, where the image to be analyzed is assumed to be N×N pixels in size. Someone of ordinary skill in the art will recognize that the following analysis is not dependent on the image being square. The reduced dimension of the face space allows a faster and cheaper analysis of the data than would otherwise be possible with the full dimensionality of the original problem.

The projection module 35 takes an image vector, $\Gamma$, and projects $\Gamma-\Psi$ onto the vector subspace of reduced dimension, the face space.

The extractor 36 utilizes information obtained from the projection module 35 and from a plurality of images representing the object to account for intra-object variation in the image arising from, for example, variation in pose, illumination, or expression. The plurality of images are obtained from a stream of data, such as a series of video frames acquired by the image acquisition device 10.

Image Data Pre-Processor: The image data pre-processor 30 forms image data corresponding to an image to be identified and can also form reference images from the reference database 18. The image data pre-processor 30 represents the image by a function $I(x_i, y_i)$ giving the intensity, expressed as an 8-bit number for example, at the pixel location $(x_i, y_i)$. If the number of horizontal and vertical pixels is N, then the function $I(x_i, y_i)$ can be represented by an N×N matrix whose components are the intensity values. The image data pre-processor 30 represents this N×N matrix as a vector in an N 2-dimensional vector space. For example, if $a_{ij}$ is the intensity at the pixel located at $x_i, y_j$ then the matrix can be represented by the column image vector $(a_{11}, \ldots, a_{1N}, a_{21}, \ldots, a_{NN})^T$. Thus, a typical image of size 256 by 256 pixels can be represented by an image vector of dimension 65,536, or, equivalently, a point in 65,536-dimensional image space. An ensemble of images, then, maps to a collection of points in this image space.

Training Stage: Image vectors of faces, being similar in overall configuration, are not randomly distributed in this image space and thus can be described by a relatively low dimensional subspace. Using principal component analysis, the vectors that best account for the distribution of image vectors within the entire image space can be identified.

The training stage 32 finds an average face image as follows. Let the training set of K acquired face images be represented by the image vectors $\Gamma_1, \Gamma_2, \Gamma_3, \ldots \Gamma_K$. The training stage 32 calculates the average face, $\Psi$, of this reference set according to $$\Psi=(K)^{-1}\Sigma_n \Gamma_n$$

where the summation is from n=1 to K. Each reference image vector differs from the average or mean face by a vector $\Phi_i = \Gamma_i - \Psi$.

Reduction stage: The reduction stage 34 employs principal component analysis (PCA) to reduce the dimensionality, $N^2$(=65,536 in the example of a 256 by 256 pixel image), of the problem to a more manageable dimension M. The PCA establishes a set of M orthonormal vectors, $u_k$, which best describe the distribution of face data within the face space. The kth vector, $u_k$, is chosen such that $$\lambda_k = (K)^{-1}\Sigma_n (u_k^T \Phi_n)^2$$

is a maximum, subject to:

$$u_k^T u_m = \delta_{km} = \begin{cases} 0 & \text{if } k = m \\ 1 & \text{if } k \neq m \end{cases}$$

The vectors $u_k$ and scalars $\lambda_k$ are the eigenvectors and eigenvalues, respectively, of the covariance matrix $$C = (K)^{-1}\sum_n \Phi_n \Phi_n^T$$
$$= AA^T$$

where the matrix A is defined by $A=(\Phi_1 \Phi_2 \ldots \Phi_K)/\sqrt{K}$. The covariance matrix C is an $N^2 \times N^2$ matrix, and determining the $N^2$ eigenvectors and eigenvalues can become an intractable task for typical image sizes.

If $K<N^2$, then it is possible to reduce the amount of computational work because there are at most K meaningful eigenvectors, where a meaningful eigenvector is one that is not associated with a zero eigenvalue. The difference between K and the degeneracy of the zero eigenvalue is equal to M. If $A^T A v=0$ has only the trivial solution, then there are K meaningful eigenvectors, otherwise there are fewer than K meaningful eigenvectors. The reduction stage 34 can solve for the $N^2$ dimensional eigenvectors in this case by first solving for the eigenvectors of the matrix $A^T A$. This last matrix, which is of dimension K×K, can be much smaller than the 65,536 by 65,536 covariance matrix (corresponding to a 256 by 256 image), and thus more manageable.

To wit, consider the eigenvectors $v_i$ of $A^T A$ satisfying:

$$A^T A v_i = \mu_i v_i$$

Premultiplying both sides by A, yields:

$$AA^T A v_i = \mu_i A v_i.$$

Therefore, provided $Av_i \neq 0$, which is generically true, or provided $\mu_i \neq 0$, if $v_i$ is an eigenvector of $A^T A$ and $\mu_i$ is the associated eigenvalue, then $Av_i$ is an eigenvector of $C=AA^T$ and $\mu_i$ is the associated eigenvalue. Note that if $Av_i=0$, then $\mu_i=0$.

Likewise, consider the eigenvectors $u_i$ of $AA^T$ satisfying:

$$AA^T u_i = \lambda_i u_i$$

Premultiplying both sides by $A^T$, yields:

$$A^T A A^T u_i = \lambda_i A^T u_i.$$

Therefore, provided $A^T u_i \neq 0$, or provided $\lambda_i \neq 0$, if $u_i$ is an eigenvector of $AA^T$ and $\lambda_i$ is the associated eigenvalue, then $A^T u_i$ is an eigenvector of $A^T A$ and $\lambda_i$ is the associated eigenvalue. Note that if $A^T u_i = 0$, then $\lambda_i = 0$.

Accordingly, the reduction stage 34 constructs the K by K matrix $A^T A$, and finds the K eigenvectors, $v_i$, of $A^T A$. These vectors determine linear combinations of the K training set face images to form the M meaningful eigenfaces $u_k$:

$$u_k = \frac{1}{\sqrt{K}} \sum_{j=1}^{K} v_{jk} \Phi_j$$

where $v_{jk}$ is the jth component of the kth eigenvector $v_k$.

The foregoing analysis greatly reduces the calculations necessary to handle the image data, from the order of the number of pixels in the image ($N^2$) to the order of the number of images in the training set (K). In practice, the training set of face images can be relatively small ($K \ll N^2$), although larger sets are also useful, and the calculations become quite manageable. The associated eigenvalues provide a basis for ranking or ordering the eigenvectors according to their usefulness in characterizing the variation among the images.

In practice, a smaller number of images M' of most significant eigenvectors chosen from the M significant eigenvectors, is sufficient for identification purposes, since complete and accurate reconstruction of the image is generally unnecessary to create a match. Framed as such, identification becomes essentially a pattern recognition task. Specifically, the eigenfaces span a second vector space of dimension M' that is a subspace of the first vector space of dimension $N^2$. The M' most significant eigenvectors of the $A^T A$ matrix are selected as those with the largest associated eigenvalues, and therefore contain the most useful image information, e.g., contain maximum variance information. For convenience, the M significant eigenvectors are normalized to unity.

Projection module: The projection module 35 performs a projection operation. In particular, given an arbitrary image vector, $\gamma$, the projection module projects the vector onto the vector space spanned by M' eigenfaces $u_j$ according to $$\gamma \to P_u \gamma = \sum_{k=1}^{M'} (u_k, \gamma) u_k$$

where $(u_k, \gamma)$ denotes an inner product:

$(u_k, \gamma) = u_k^T \gamma.$

Thus, $P_u$ is the projection operator onto the subspace spanned by the M' most significant eigenvectors. The projection module can also compute $[P_u \gamma]_u$, the column vector representation of $P_u \gamma$ in the basis $\{u_1, \ldots, u_{M'}\}$.

As mentioned above, M' is at most M, where M is the dimension of the vector space spanned by the M meaningful vectors, but in practice can be less than M if some of the meaningful eigenvectors associated with small, but non-vanishing eigenvalue, are neglected.

Extractor: The extractor 36 obtains a similarity covariance matrix together with its eigenvectors. These eigenvectors, dubbed similarity eigenvectors, are used to extract information from $\Omega = [P_u(\Gamma - \Psi)]_u$, where $\Gamma$ is an unknown image vector to be identified. This information can then be processed to help identify $\Gamma$.

The extractor 36 uses as input a set of R image vectors, $\{\gamma_1, \gamma_2 \ldots \gamma_R\}$, corresponding to a particular individual. This set of image vectors can correspond to the same individual with different illumination, expression, or pose. Using this set of images, R column vectors can be calculated with the help of the projection module 35, the jth one given by $\Omega_j = (\Omega_{1j} \Omega_{2j} \ldots \Omega_{M'j})^T$ where $\Omega_{ij} = (u_i, \gamma_j - \Psi)$. In other words, $\Omega_j = [P_u(\gamma_j - \Psi)]_u$. Using these column vectors, an M'×M' similarity covariance matrix, $C_s$, can be calculated as follows:

$$C_s = \frac{1}{R} \sum_{n=1}^{R} (\Omega_n - \overline{\Omega})(\Omega_n - \overline{\Omega})^T,$$

where the average vector $\overline{\Omega}$ is given by $$\overline{\Omega} = \frac{1}{R} \sum_{j=1}^{R} \Omega_j.$$

Thus, $C_S$ is the covariance matrix associated with covariances of intrapersonal variations of a particular individual. The extractor 37 can compute $C_S$ for an individual to be identified, or a known individual from the reference database. In the latter case, the extractor can use the set of vectors $\{\Omega_1^j, \Omega_2^j, \ldots\}$, pertaining to the particular individual j, to calculate the covariance matrix for individual j.

Two implementations of the present invention can be utilized that pertain to two ways in which the covariance matrices can be used for image recognition. The first implementation is appropriate when many images of the same individual are available. The first implementation utilizes a distinct similarity covariance matrix for each individual to generate a unique projector, $P_s$, for each individual, as described below in more detail. The second implementation may be appropriate when there is an individual to which there corresponds only a few (as little as one) available images. The second implementation utilizes a composite similarity covariance matrix to generate a common projector, $P_{s,comp}$ for all the individuals, as described below in more detail. In the present invention, the image acquisition device can typically acquire an ample number of images of the individual to be identified. However, there may or may not be ample images of a known individual in the reference database 18. In such case, the second implementation may be more appropriate. The two implementations are now described in turn.

Implementation I:

The eigenvectors of the similarity covariance vector are $s_1, \ldots, s_{M'}$. These eigenvectors can be obtained by diagonalizing the M'×M' matrix that is $C_s$ directly. Instead, we can diagonalize a smaller R×R matrix by analogy to how the eigenvectors of $AA^T$ were found above by diagonalizing $A^TA$. $P_s$ denotes the projection operator onto the subspace spanned by the significant similarity eigenvectors (i.e., the eigenvectors of $C_s$ not corresponding to the zero eigenvalue, if such an eigenvalue exists):

$$P_s \Omega = \sum_j (s_j, \Omega) s_j$$

In another embodiment, $P_s$ can denote the projection operator onto a subspace spanned by a subset of the significant similarity eigenvectors corresponding to the largest eigenvalues, which are the most significant similarity eigenvectors (the number of most significant similarity eigenvectors can be varied in different embodiments to optimize results).

Given an image vector $\Gamma$ that is to be identified, the projection module 35 can compute $\Omega = [P_u(\Gamma - \Psi)]_u$. The extractor 36 can then compute $P_s \Omega$, which may be used by the discrimination stage 20, described below, to identify the image vector $\Gamma$. Note that in this first implementation, to each individual there corresponds a generally unique projector $P_s$.

Implementation II.

In another implementation, a composite similarity covariance matrix $C_{S,comp}$ is computed before calculating its eigenvectors. In particular, the composite similarity covariance matrix is formed from the sum of similarity covariance matrices of different individuals:

$$C_{s,comp} = \sum_j C_{s,j}$$

Here, $C_{s,j}$ denotes the covariance matrix of a particular individual j. The individual j may be a known individual, from the reference database 18, for example, or an unknown individual. Note that to obtain a non-zero covariance matrix $C_{s,j}$, at least two images of individual j are needed. The extractor 36 can then calculate the eigenvectors of the composite similarity covariance vector, which are denoted by $s_{1,comp}, \ldots, s_{M',comp}$. These eigenvectors can be obtained by diagonalizing the M'×M' matrix that is $C_{S,comp}$. The operator $P_{s,comp}$ denotes the projector onto the subspace spanned by the significant similarity eigenvectors of $C_{s,comp}$ (i.e., the eigenvectors of $C_{s,comp}$ not corresponding to the zero eigenvalue, if such an eigenvalue exists). In another embodiment, $P_{s,comp}$ can denote the projection operator onto a subset of the significant similarity eigenvectors corresponding to the largest eigenvalues, which are the most significant similarity eigenvectors (the number of most significant similarity eigenvectors can be varied in different embodiments to optimize results).

Given an image vector $\Gamma$ that is to be identified, the projection module 35 can compute $\Omega = [P_u(\Gamma - \Psi)]_u$. The extractor 36 can then compute $P_{s,comp} \Psi$, which may be used by the discrimination stage 20, described below, to identify the image vector $\Gamma$. Note that in this second implementation, each individual is projected by a common projector $P_{s,comp}$.

Figure 3:
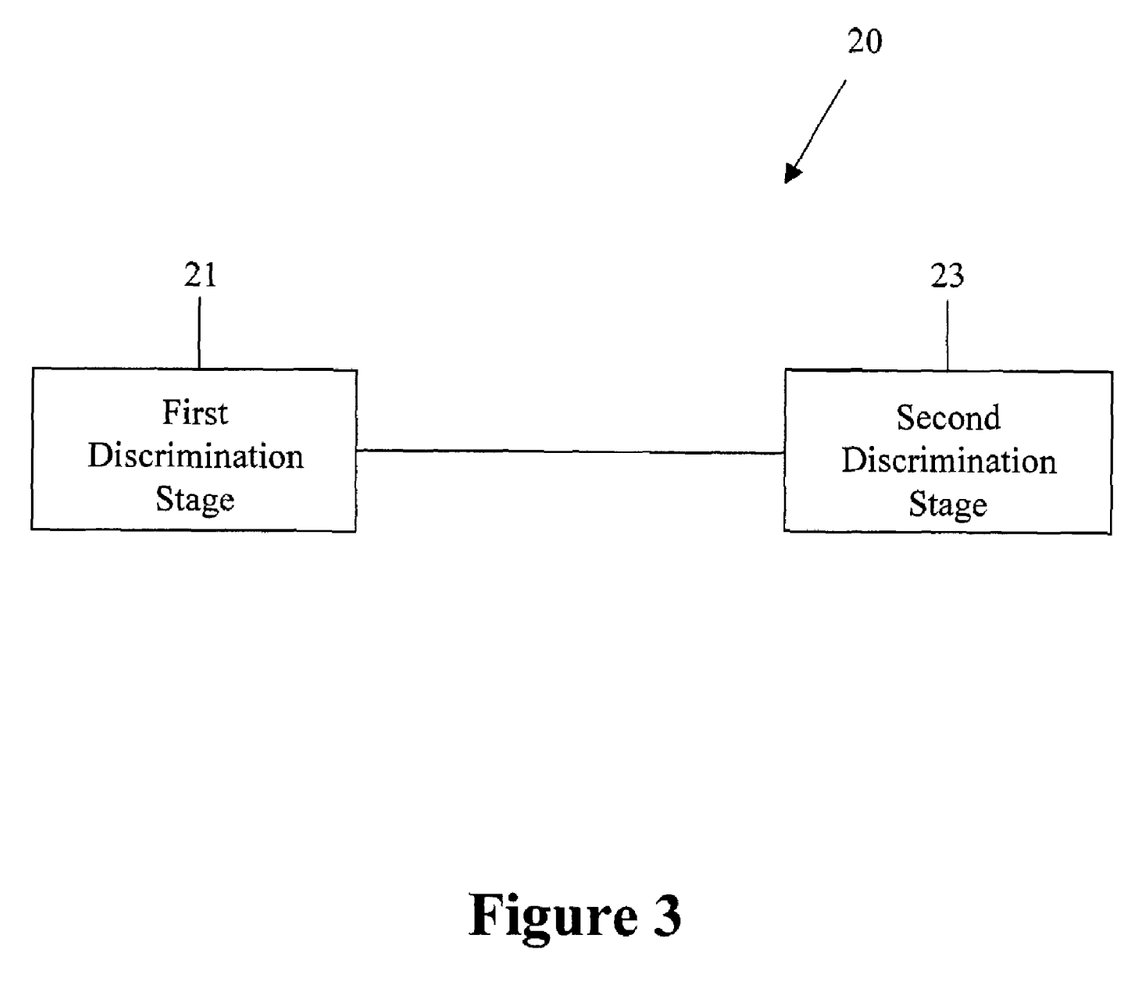
FIG. 3 shows more details of the discrimination stage shown in FIG. 1 according to the teachings of the present invention.

Discriminating Stage:

Referring to FIGS. 2 and 3 the discrimination stage 20 identifies the individual. In one embodiment, the discrimination stage 20 includes a first discrimination stage 21 and a second discrimination stage 23. The first discrimination stage 21 determines whether the image vector corresponds to a human face. If it does not, for example the image vector may correspond to an inanimate object, the recognition analysis can stop. If the first discrimination stage 21 determines that the image vector corresponds to a human face, the second discrimination stage 23 attempts to identify the face. In another embodiment, the discrimination stage 20 need not include a first discrimination stage 31, assuming the image corresponds to a human and proceeding to identify it with the second discrimination stage.

To determine whether the image vector F corresponds to a human face, the first discrimination stage 21 computes $\|(1-P_u)(\Gamma-\Psi)\|$, the norm of the vector $(1-P_u)(\Gamma-\Psi)$, which can be interpreted as the distance of $\Gamma-\Psi$ to the face space. If this norm is greater than some threshold $\theta_1$, that is if $$\|(1-P_u)(\Gamma-\Psi)\| > \theta_1,$$

then the first discrimination stage 21 deems $\Gamma$ to not be a human face and further analysis can stop. If the norm is less than or equal to $\theta_1$, the second discrimination stage proceeds to attempt to identify the face.

Implementation I:

If $\|(1-P_u)(\Gamma-\Psi)\| \leq \theta_1$, the second discrimination stage 23 computes the norm $\|(1-P_s)\Omega - (1-P_s)\Omega_{c1}\|$, where $\Omega_{c1}$ is the column vector that corresponds to a particular class of individuals. For example, the class of individuals may be a single individual j, and may be obtained by averaging J images of the same individual j, $$\Omega_{cl=j} = J^{-1} \sum_{m=1}^{J} \Omega_m^j.$$

The number J may be as small as one. If this norm is less than some threshold $\theta_2$, i.e., if $$\|(1-P_s)\Omega - (1-P_s)\Omega_{c1}\| < \theta_2,$$

then the individual has been identified as belonging to the same class that $\Omega_{c1}$ represents.

Note that $P_S$ is not generally a linear operator because firstly the domain of the operator $P_S$ need not be a vector space. Instead, the domain of the operator $P_S$ can be the union of the set of all class vectors, $\Omega_{c1}$, associated with the reference database 18, and the set of unidentified vectors, a member of which has been denoted by $\Omega$. Secondly, it is not generally true that the image of a sum of vectors is the sum of the images. For example, note that the set of all class vectors may not be independent. Therefore, one class vector, say $\Omega_{c1,3}$, may be equal to the sum of two other class vectors, $\Omega_{c1,3} = \Omega_{c1,1} + \Omega_{c1,2}$. In general, $P_s\Omega_{c1,3} \neq P_s\Omega_{c1,1} + P_s\Omega_{c1,2}$ since $P_s\Omega_{c1,3}$ is a projection onto a subspace spanned by eigenvectors of the similarity covariance matrix obtained from variations in the image $Q_{c1,3}$, whereas $P_s\Omega_{c1,1}$ is a projection onto a different subspace spanned by eigenvectors of the similarity covariance matrix obtained from variations in the image $\Omega_{c1,1}$.

In another embodiment, the vectors $(1-P_s)\Omega$ and $(1-P_s)\Omega_{c1}$ can first be normalized. Thus, if $$\left\| \frac{(1-P_s)\Omega}{\|(1-P_s)\Omega\|} - \frac{(1-P_s)\Omega_{cl}}{\|(1-P_s)\Omega_{cl}\|} \right\| < \theta_2,$$

the individual has been identified as belonging to the same class that $\Omega_{c1}$ represents.

Implementation II:

If $\|(1-P_u)(\Gamma-\Psi)\| \leq \theta_1$, the second discrimination stage 23 computes the norm $\|(1-P_{s,comp})(\Omega-\Omega_{c1})\|$, where $\Omega_{c1}$ is the column vector that corresponds to a particular class of individuals. For example, the class of individuals may be a single individual, and may be obtained by averaging images of the same individual, or by using a single image of an individual. If this norm is less than some threshold $\theta_2$, i.e., if $$\|(1-P_{s,comp})(\Omega-\Omega_{c1})\| < \theta_2,$$

then the individual has been identified as belonging to the same class that $\Omega_{c1}$ represents. This last inequality can also be written as $\|(1-P_{s,comp})[P_u(\Gamma-\Gamma_{c1})]_u\| \leq \theta_2$ since $$\Omega - \Omega_{cl} = [P_u(\Gamma - \Psi)]_u - [P_u(\Gamma_{cl} - \Psi)]_u$$

$$= P_u(\Gamma - \Gamma_{cl})]_u.$$

In another embodiment, the vectors $(1-P_{s,comp})\Omega$ and $(1-P_{s,comp})\Omega_{c1}$ can first be normalized. Thus, if $$\left\| \frac{(1-P_{s,comp})\Omega}{\|(1-P_{s,comp})\Omega\|} - \frac{(1-P_{s,comp})\Omega_{cl}}{\|(1-P_{s,comp})\Omega_{cl}\|} \right\| < \theta_2,$$

the individual has been identified as belonging to the same class that $\Omega_{c1}$ represents.

Regardless of the implementation, the above description involves associating an image of an object with the vector $\Gamma-\Psi$, projecting that vector using principal component analysis to yield $\Omega$, and then projecting $\Omega$ using $(1-P_s)$ or $(1-P_{s,comp})$ to account for intrapersonal variation. Those of ordinary skill in the art will recognize that the middle step using principal component analysis can, in one embodiment of the present invention, be omitted. In such case, $P_s$, for example, would project onto the subspace spanned by eigenvectors of the covariance matrix $$R^{-1} \sum_{j=1}^{R} \gamma_j \gamma_j^T.$$

A function of the projected vector $(1-P_s)(\Gamma-\Omega)$ or the projected vector $(1-P_{s,comp})(\Gamma-\Psi)$ can then be evaluated to match the image to the database. The function, for example, can involve a norm to determine a match with a reference vector analogous to the method described above.

Figure 4:
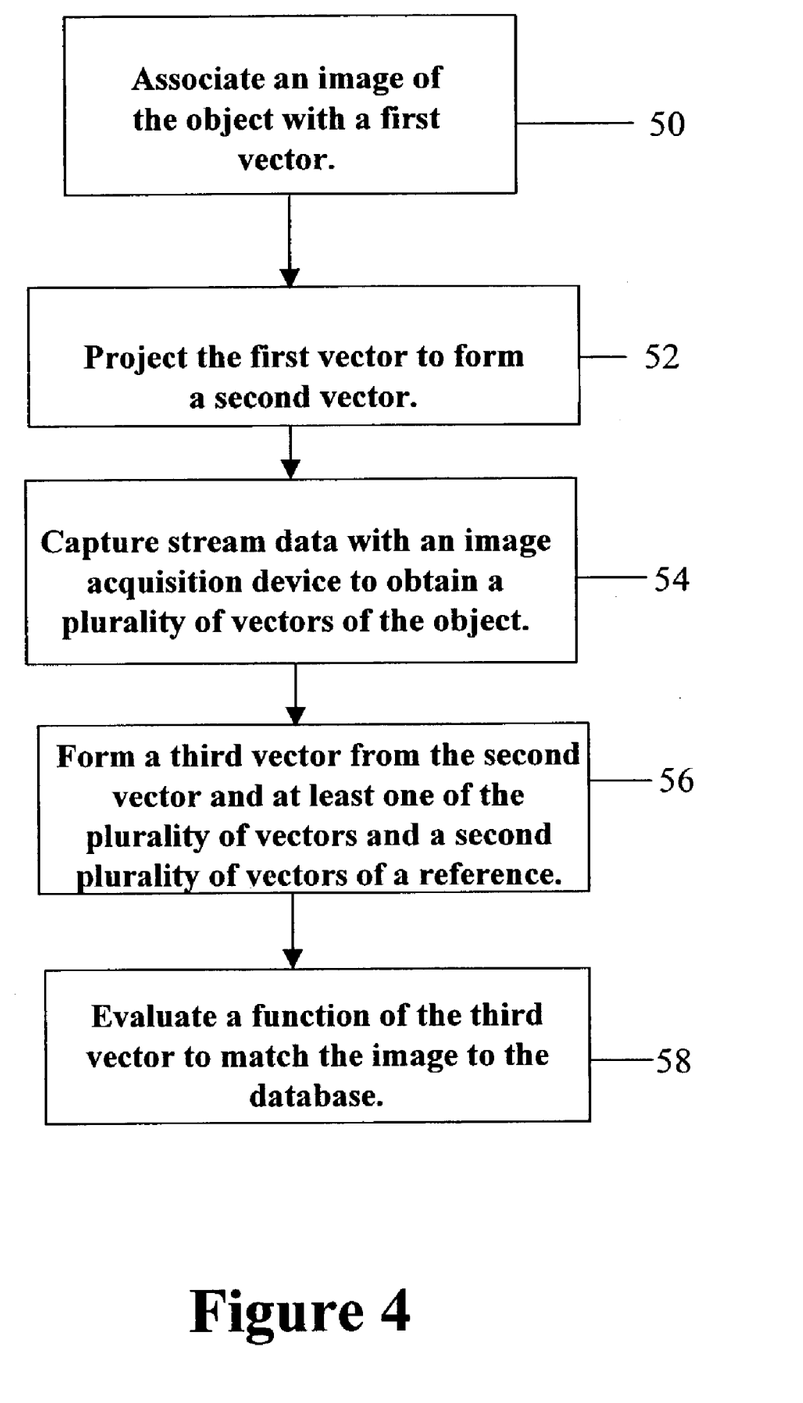
FIG. 4 illustrates a block flow diagram for recognizing an object in accordance with an illustrative embodiment of the present invention.

Referring to FIG. 4, a flowchart showing steps for identifying an individual is shown. In step 50, an image of the object is associated with a first vector. In step 52, the first vector is projected to form a second vector. In step 54, a stream of data is acquired with an image acquisition device to obtain a first plurality of images representing the individual. To account for intra-object variation of the individual between each of the acquired images, in step 56, a third vector is formed from the second vector and at least one of the first plurality of vectors representing the individual and a second plurality of vectors representing a reference. In step 58, a function of the third vector is evaluated to match the image to one from a database to determine if the individual is identifiable.

Those skilled in the art will recognize, or be able to ascertain using no more than routine experimentation, many equivalents to the specific embodiments and methods described herein. For example, although reference has been made to recognizing faces and humans, those of ordinary skill in the art will appreciate that the aforementioned techniques can be applied to distinguish various objects, animate as well as inanimate. In addition, someone of ordinary skill in the art will appreciate that a hybrid of the two implementations described above can be used, where for some individuals, their own projectors are utilized to account for intrapersonal variation, whereas for other individuals a composite projector is utilized. Such equivalents are intended to be encompassed by the scope of the following claims.

What is claimed is:

1. A method for identifying an individual, the method comprising the steps of:
   determining a range of one or more parameters in a plurality of images of the individual;
   generating a reference representation of the individual using the plurality of images and the range of one or more parameters to characterize image variation of the individual amongst the plurality of images;
   selecting one of the plurality of images;
   compensating the selected image using the reference representation to counteract at least a portion of the image variation of the individual amongst the plurality of images; and
   determining if the selected image sufficiently corresponds to a representation from a storage device for identifying the individual.

2. The method of claim 1, wherein the step of determining if the selected image sufficiently corresponds to a representation from a storage device for identifying the individual comprises the step of,
   determining a distance between a representation of the selected image and the representation from the storage device.

3. The method of claim 2, wherein the distance comprises a Euclidean distance.

4. The method of claim 1, further comprising the step of, acquiring the plurality of images of the individual using an image acquisition device.

5. The method of claim 1, further comprising the step of, compensating the representation from the storage device using the reference representation to cancel out at least a portion of image variation in the representation.

6. The method of claim 1, further comprising the step of, identifying at least one component from the plurality of images that is attributable to image variation of the individual.

7. A system for identifying an individual, the system comprising:
- an image data manipulation module for determining a range of one or more parameters in a plurality of images of the individual and for generating a reference representation of the individual using the plurality of images and the range of one or more parameters, the reference representation characterizing image variation of the individual amongst the plurality of images, the image data manipulation module compensates at least one of the plurality of images using the reference representation to counteract at least a portion of the image variation of the individual amongst the plurality of images; and
- a discrimination module for determining if the one of the plurality of images matches a representation from a storage device to within one or more specified tolerances to identify the individual.

8. The system of claim 7, wherein the one or more tolerances include a distance value between the one of the plurality of images and the representation from the storage device.

9. The system of claim 8, wherein the distance value comprises a Euclidean distance value.

10. The system of claim 7, further comprising, an image acquisition device for acquiring the plurality of images of the individual.

11. The system of claim 7, wherein the image data manipulation module is capable of compensating the representation from the storage device using the reference representation to null out at least a portion of image variation in the representation.

12. The system of claim 7, wherein the image data manipulation module is capable of identifying at least one component from the plurality of images that is attributable to image variation of the individual.

13. A device readable medium holding device executable instructions for performing a method for identifying an individual, the method comprising the steps of:
- determining from a plurality of images of the individual one or more image components in the plurality of images of the individual that vary due to illumination of the individual, facial expression of the individual and pose of the individual;
- generating a reference representation of the individual using the plurality of images and the one or more image components to characterize image variation of the individual amongst the plurality of images;
- selecting one of the plurality of images and compensating the selected image using the reference representation to counteract at least a portion of the image variation of the individual amongst the plurality of images; and
- determining if the selected image corresponds to a representation from a storage device to identify the individual.

14. The device readable medium of claim 13, wherein the step of determining if the selected image corresponds to a representation from a storage device for identifying the individual comprises the step of,
- determining a distance value between the selected image and the representation from the storage device.

15. The device readable medium of claim 14, wherein the distance value comprises a Euclidean distance value.

16. The device readable medium of claim 13, further comprising the step of, acquiring the plurality of images of the individual using an image acquisition device.

17. The device readable medium of claim 13, further comprising the step of, compensating the representation from the storage device using the reference representation to negate at least a portion of a detectable image variation of the individual in the representation.

* * * * *